United States Patent [19]

Oliva et al.

[11] Patent Number: 4,701,946

[45] Date of Patent: Oct. 20, 1987

[54] DEVICE FOR CONTROLLING THE APPLICATION OF POWER TO A COMPUTER

[76] Inventors: Raymond A. Oliva, 3109 Camdon Ct., Pleasanton, Calif. 94566; Joseph S. Metz, 5906 Cinnabar Ct., Newark, Calif. 94560

[21] Appl. No.: 663,800

[22] Filed: Oct. 23, 1984

[51] Int. Cl.$^4$ ........................................... H04M 11/00
[52] U.S. Cl. ........................................ 379/98; 379/93; 379/102
[58] Field of Search .................. 179/2 A, 2 AM, 2 C, 179/2 DP, 2 TC; 375/8; 364/200 MS File, 900 MS File; 379/93, 97, 98, 102, 105, 106, 107

[56] References Cited

U.S. PATENT DOCUMENTS

| | | |
|---|---|---|
| 3,549,809 | 12/1970 | Stehr . |
| 3,588,357 | 6/1971 | Sellari, Jr. ........................ 179/2 A |
| 3,745,251 | 7/1973 | Fretwell . |
| 3,868,640 | 2/1975 | Binnie et al. ..................... 179/2 AM |
| 4,028,493 | 6/1977 | Brennemann et al. ........... 179/2 DP |
| 4,051,326 | 9/1977 | Badagnani et al. ............... 179/2 DP |
| 4,121,052 | 10/1978 | Richard ............................. 179/2 DP |
| 4,126,762 | 11/1978 | Martin et al. ..................... 179/2 A |
| 4,219,697 | 8/1980 | Reynolds .......................... 179/2 A |
| 4,308,430 | 12/1981 | Fahey et al. ...................... 179/5 R |
| 4,332,980 | 6/1982 | Reynolds et al. ................. 179/2 A |
| 4,356,545 | 10/1982 | West ................................. 179/2 DP X |
| 4,390,750 | 6/1983 | Bartelink ......................... 179/2 A X |
| 4,415,774 | 11/1983 | Driver . |
| 4,418,244 | 11/1983 | Edgar . |
| 4,442,319 | 4/1984 | Treidl ............................... 179/2 A |
| 4,443,664 | 4/1984 | Gange .............................. 179/2 DP X |
| 4,469,917 | 9/1984 | Shelley . |
| 4,524,244 | 6/1985 | Faggin et al. .................... 179/2 DP |
| 4,647,721 | 3/1987 | Busam et al. .................... 379/93 X |

OTHER PUBLICATIONS

MacBride et al, "Remote Computer Power-On Via Switched Telephone Network", *IBM Technical Disclosure Bulletin*, vol. 25, No. 6, Nov. 1982, p. 3064.

*Primary Examiner*—Keith E. George
*Attorney, Agent, or Firm*—Townsend & Townsend

[57] ABSTRACT

Apparatus and method for monitoring the state of the phone line, directly or as reflected by signals from the modem, and controlling the application of power to a computer so that the computer is powered in response to an incoming call. The apparatus includes a controllable power switching element interposed between the power source and the computer's power input, and logic circuitry responsive to the state of the phone line or modem interface for controlling the power switching element. An alarm clock also controls the power switching element to power the computer up at a predetermined time.

15 Claims, 10 Drawing Figures

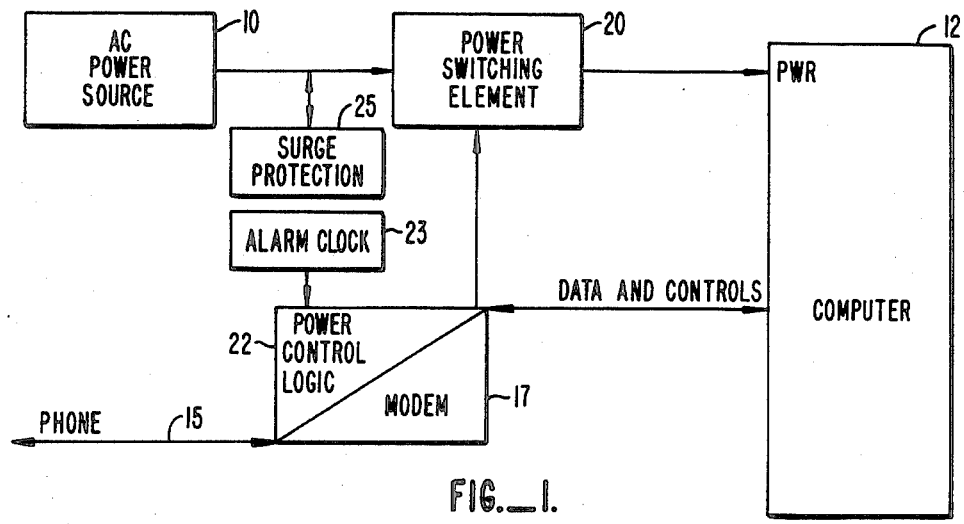
FIG.—1.
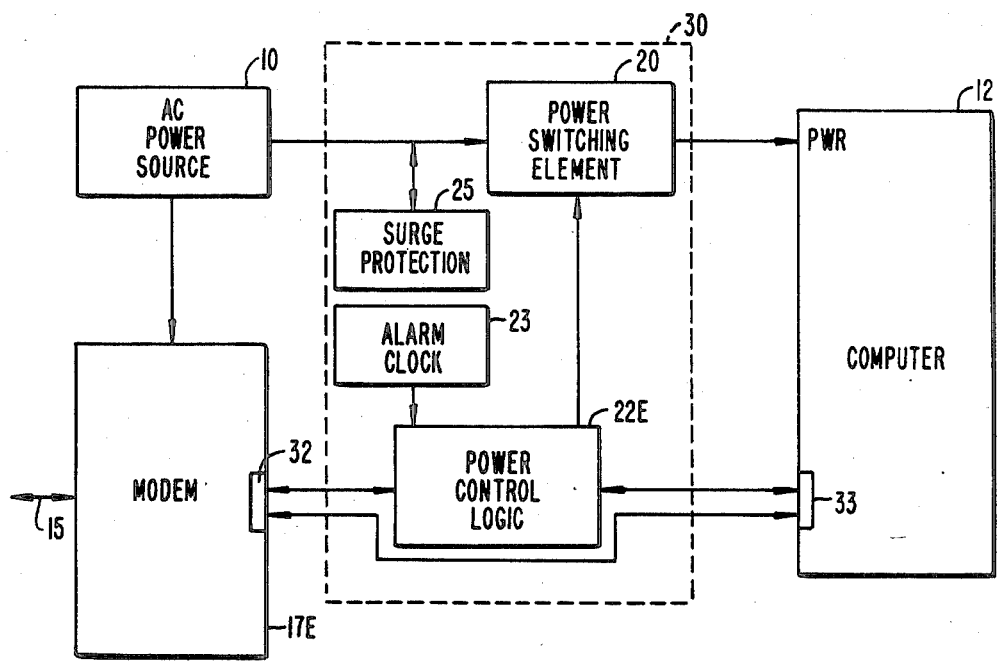
FIG.—2A.

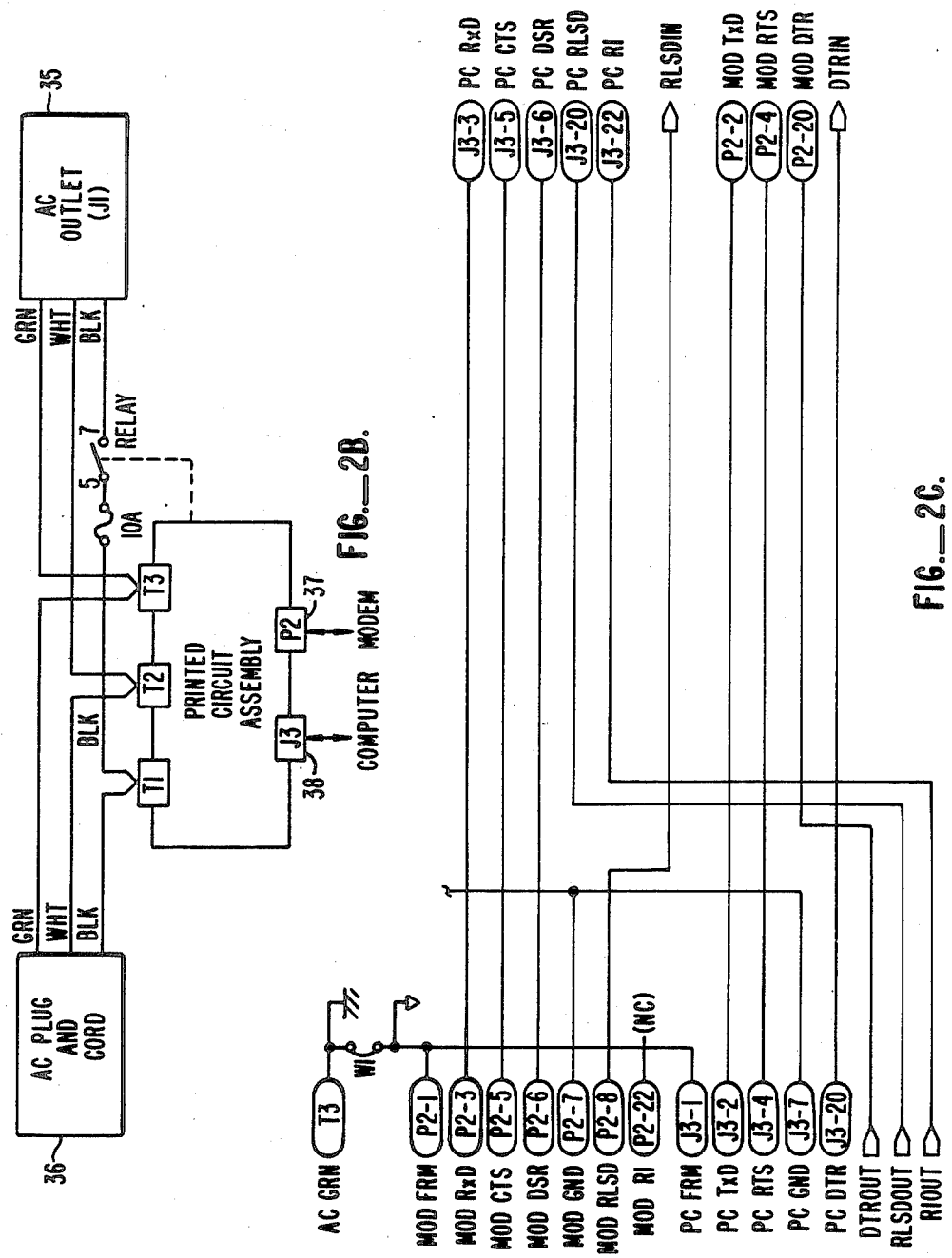

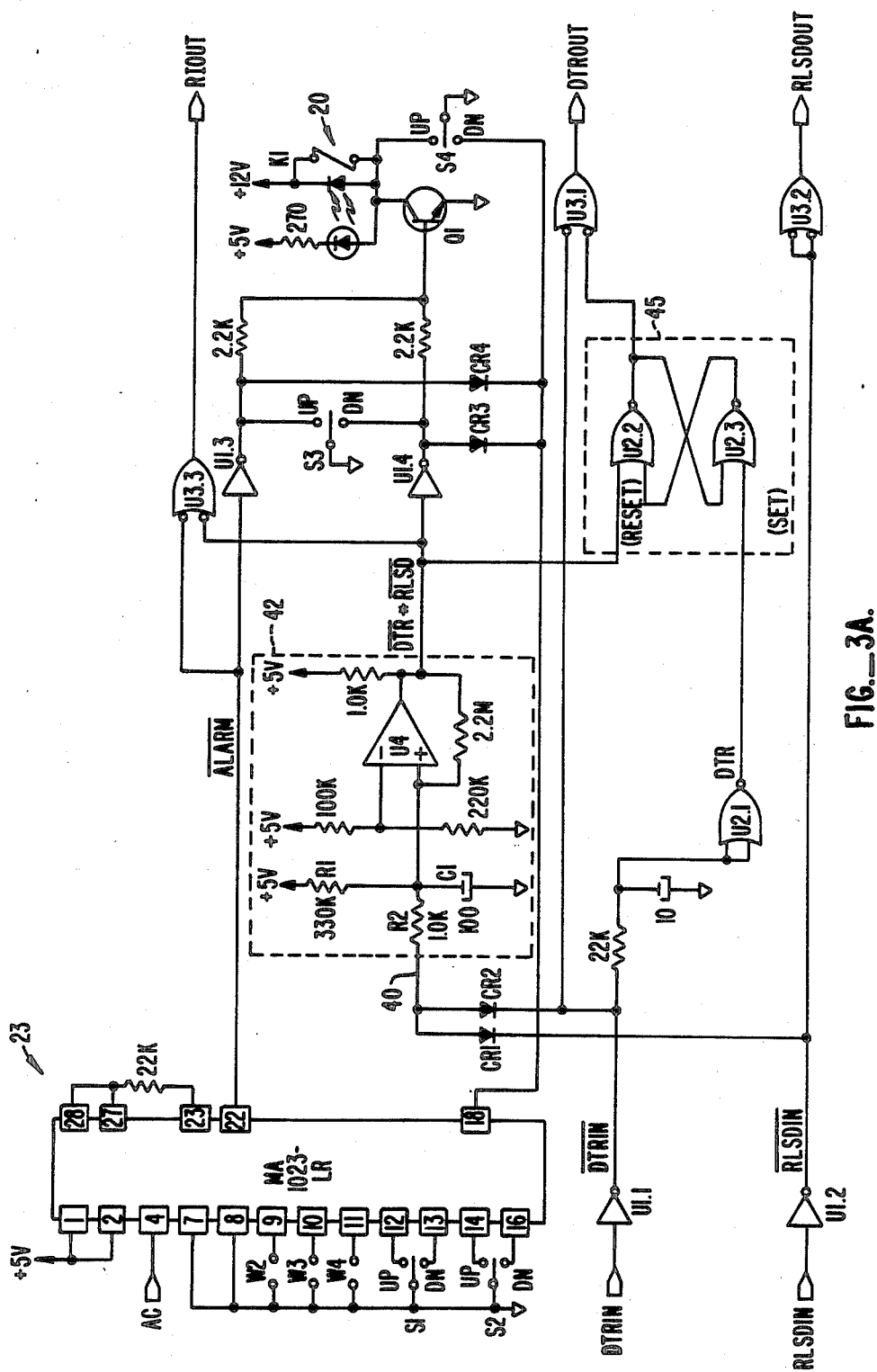
FIG._3A.

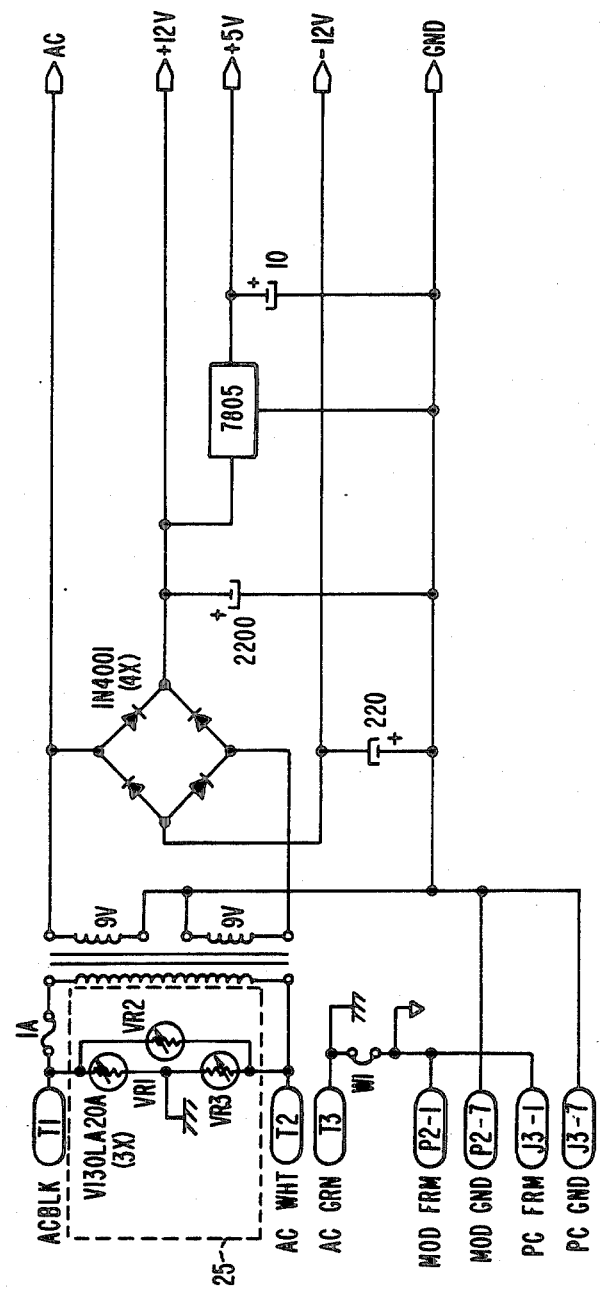
FIG._3B.

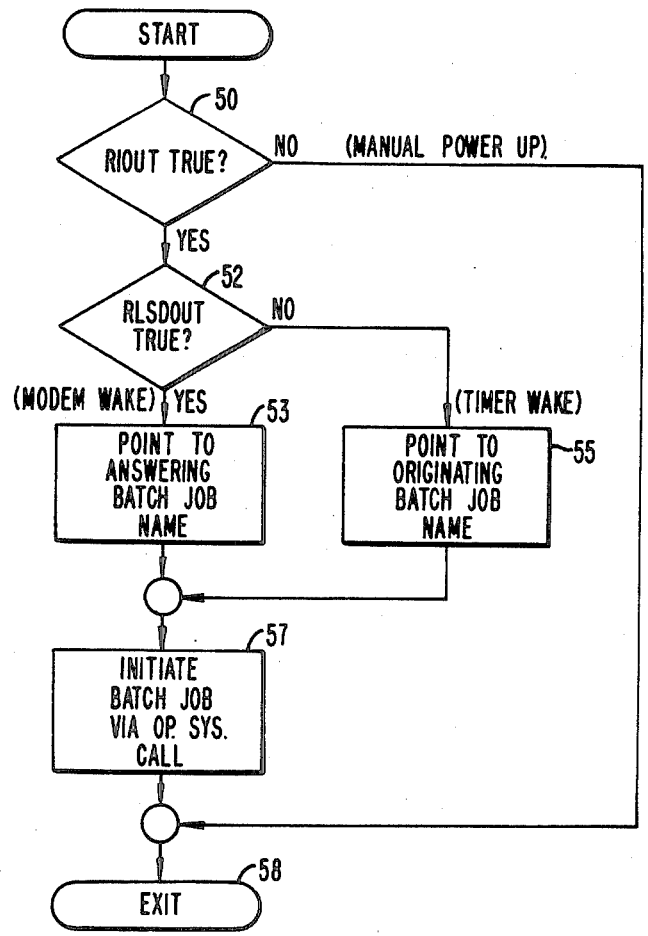
FIG._4.
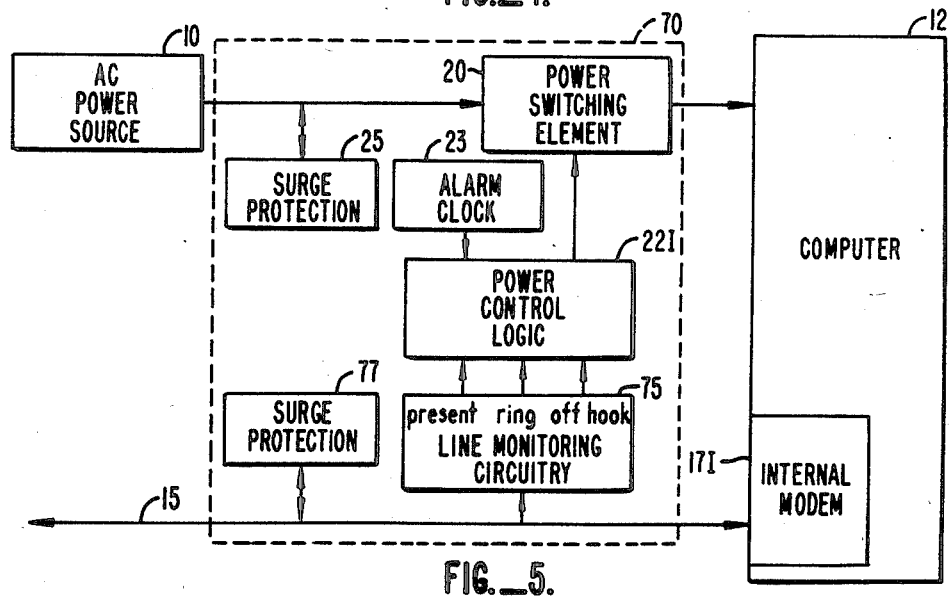
FIG._5.

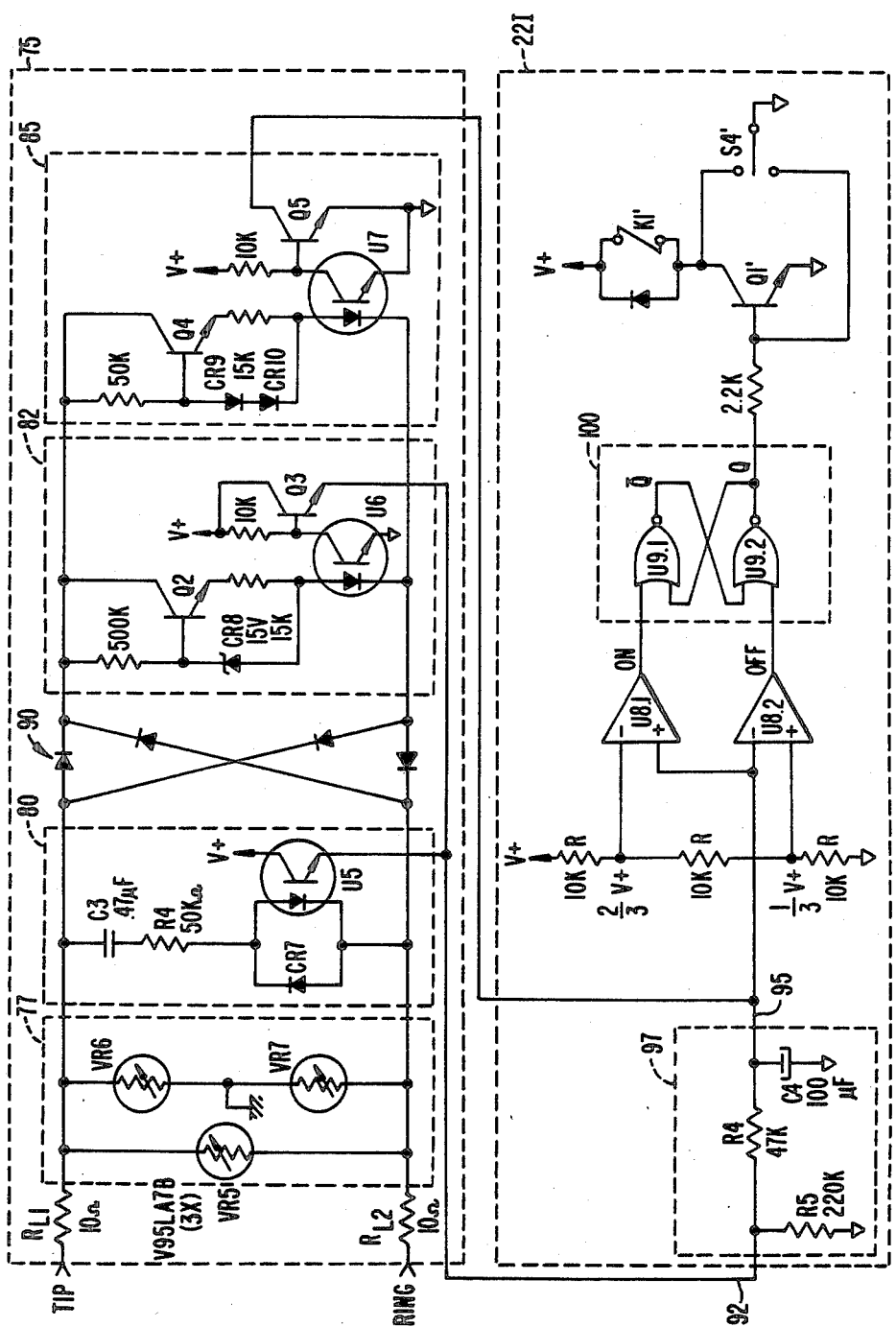
FIG._6.

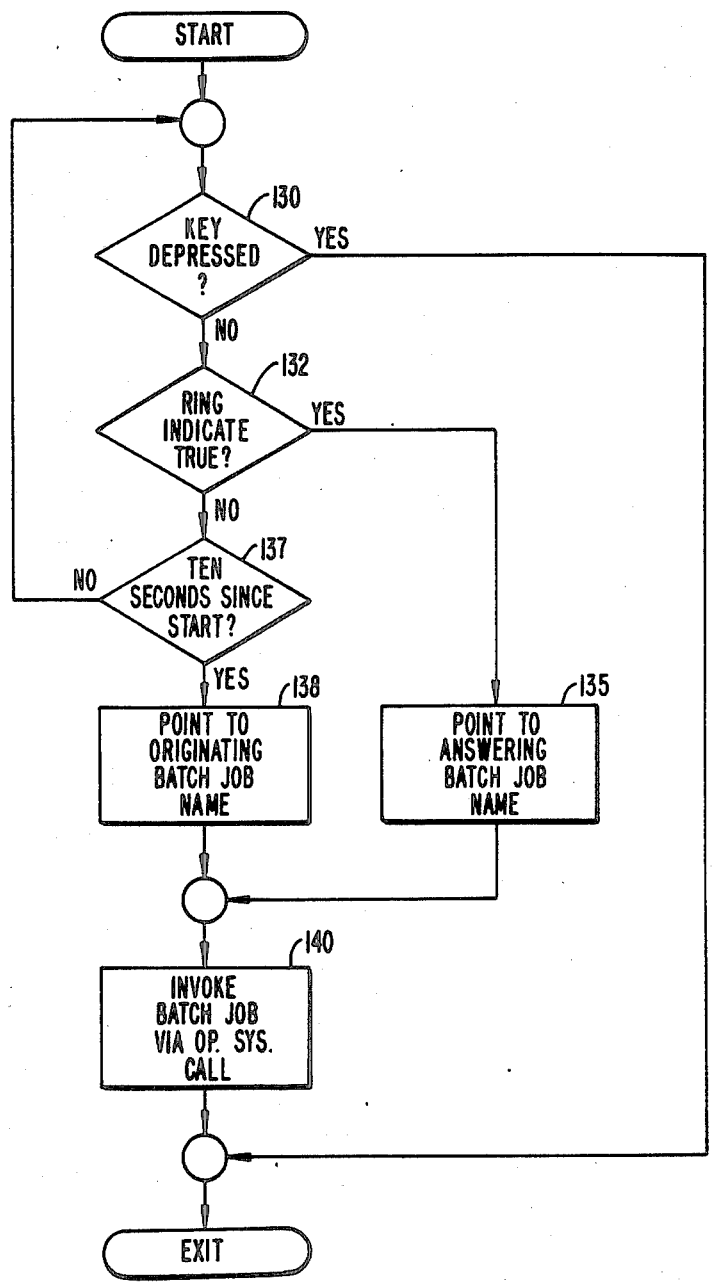
FIG._7.

DEVICE FOR CONTROLLING THE APPLICATION OF POWER TO A COMPUTER

FIELD OF THE INVENTION

The invention relates generally to a system for powering computers, and more specifically to an apparatus and method for automatically powering a computer in response to an incoming data transmission.

BACKGROUND OF THE INVENTION

Although the ability of a computer user to access other computers was once considered a luxury or a curiosity, that ability is rapidly becoming a practical necessity. A user typically acquires this ability by coupling a modem to his or her computer's serial I/O port and utilizing the telephone network as the communications medium. The user can then establish communication with remote computers for any desired purpose—paying a bill, obtaining the current price of a share of XYZ Corporation's stock, or doing an on-line patent search.

In the present context, the term "modem" normally refers to an auto-dialing, auto-answering modem, which may be external or internal. An external modem is a stand-alone device having one connector for coupling to the telephone lines and another connector for coupling to the computer's I/O port. The I/O port is commonly an RS-232 interface, which has become a virtual industry standard for asynchronous serial communications in microcomputer devices. The RS-232 interface specifies a set of control signals and voltage levels (nominally ±12 volts). An internal modem, as the name implies, is built into the computer enclosure. In either case, the modem and the computer exchange a number of control signals according to a specific protocol so as to condition the modem to accept incoming data calls or place outgoing calls.

Unfortunately, but not surprisingly, the practice sometimes falls short of the theory. A remote computer does not always answer when called; it may be off or it may be busy with other callers. Moreover, the phone lines are at times an imperfect communications medium.

However, in view of the new-found power and flexibility that result from the ability to establish remote communications, computer users have accepted the frustrations of not always being able to establish data communications as a small price to pay.

SUMMARY OF THE INVENTION

The present invention allows a computer to originate and receive phone calls, even though initially in a powered-down state, without operator intervention. The invention may be utilized for external modem and built-in modem configurations and requires no expansion of the computer's I/O capabilities beyond that needed to establish a modem interface.

Broadly, the invention contemplates monitoring the state of the phone line, directly or as reflected by signals from the modem, and controlling the application of power to the computer so that the computer is powered up in response to an incoming call. To this end, the apparatus includes a controllable power switching element interposed between the power source and the computer's power input, and logic circuitry responsive to the state of the phone line or modem interface for controlling the power switching element. The apparatus may also include an alarm clock that causes the computer to be powered up at a predetermined time.

The advantages of such a capability, while not immediately apparent, are relatively significant. Keeping a computer on at all times is dangerous. High voltage transients on the power lines can cause catastrophic damage to a computer that is powered at the time. Even more serious destruction can occur if the damaged computer then sets its surroundings on fire. Keeping a computer on at all times is also expensive. In addition to the cost of power (both the actual power dissipated and the power for the increased air-conditioning necessitated by the computer's power dissipation), there is the cost of such items as fan motors and display screens whose lives are shortened by their being powered at all times. In view of these dangers and costs, many, if not most users keep their computers off when not using them.

The present invention, however, reduces the dangers and costs, while allowing users to exploit the full capabilities of their computers. Since the computer is powered up in response to incoming calls or at specified times, it can receive and transmit data at the optimum times, for example when phone rates are lowest or when fewest users are competing for access to the remote computer.

In a first embodiment, for use with a computer and an external modem that is always powered, the logic circuitry senses and responds to signals on the interface lines between the modem and the computer to determine when an incoming call occurs, when the call has been answered, and whether the call is in progress. More particularly, the monitoring circuitry senses the RLSD (received line signal detect) signal from the modem and the DTR (data terminal ready) signal from the computer. RLSD indicates that the modem has detected a valid data signal on the phone interface; DTR indicates that the computer intends to use the interface for some purpose.

The logic circuitry controls the power switching element in response to the state of the RLSD and DTR signals. If either RLSD or DTR is "true," the logic circuitry asserts the control signal necessary to condition the power switching element to permit power to be applied to the computer. However, if both RLSD and DTR are false, the control signal is withdrawn so that the power switching element assumes its blocking state which causes the computer to lose power.

While RLSD is passed unchanged to the computer, DTR is manipulated as follows. Since loss of the DTR signal usually causes the modem to disconnect any call in progress and enter an inactive state, the logic circuitry forces DTR "true" when the computer is unpowered so that the modem remains in a state operable to answer incoming phone calls. The logic circuitry includes a bistable element, such as flip-flop, for holding an indication that the computer is capable of assuming control of the DTR signal, and DTR is gated with the output of this element. The flip-flop is set when DTR is "true," and reset when power is removed from the computer. When the flip-flop is reset, DTR is forced "true." Thus, when the computer responds to or originates a call (DTR "true"), the gating allows DTR (as seen at the modem) to be controlled by the computer, so that when DTR goes "false," this is passed to the modem.

In a second embodiment, primarily for use with an internal modem, the logic circuitry has associated circuitry for monitoring the telephone lines directly. This circuitry provides signals representative of the state of the telephone line, including a PRESENT signal signifying that the phone line is actually connected, a RING signal signifying the occurrence of an incoming call, and an OFF-HOOK signal signifying that the computer has answered the incoming call or initiated the outgoing call. These signals are communicated to the logic circuitry which controls the power switching element as follows. So long as either RING or OFF-HOOK is "true," the control signal remains asserted and power is maintained. When OFF-HOOK and RING are both "false," the control signal is withdrawn and the power switching element assumes its blocking state to prevent power from flowing to the computer. If PRESENT is "false," the control signal is suppressed and the computer maintained in the unpowered state, regardless of the state of RING and OFF-HOOK.

In both embodiments, a power hold-up circuit is incorporated into the logic circuitry to make sure that computer power is not lost for a predetermined time interval after the DTR and RLSD (or OFF-HOOK and RING) signals become false. A 30-second interval is normally sufficient for the computer to close all files and reach an idle state before being powered down.

Both embodiments may include the alarm clock and associated circuitry operable to supply the control signal to the power switching element at a predetermined time and for at least a predetermined time interval (for example, 59 minutes). This allows the computer to place outgoing calls at a desired time. The clock circuitry operates in conjunction with the logic circuitry so that power is also supplied in response to an incoming call.

A selector switch may be associated with the logic circuitry and the alarm clock circuitry to select the circumstances under which power may be applied to the computer. Thus, energization may be specified to occur in response to clock only, incoming call only, or either. Additionally, the apparatus preferably includes an override switch that overrides the effect of signals from the logic circuitry or clock circuitry so that the computer may be powered on or off unconditionally.

The computer is preferably programmed to execute specific tasks as part of the automatic power-up batch job. To the extent possible, the computer is provided with a signal signifying whether the computer was powered up manually or as a result of the automatic operation discussed above.

In the first embodiment, a signal corresponding to the control signal that conditions the power switching circuitry is used to signify that the computer was powered up automatically. If this signal is "true," the state of RLSD is sufficient to establish the cause of automatic powering up. If RLSD is "true," the computer answers the incoming call; if RLSD is "false," the computer initiates a phone call or a series of phone calls.

In the second embodiment, the computer prompts for a keystroke from the operator. If none is detected within a given time interval (say 10 seconds), the power-up is assumed to have been automatic. If no ring signal is detected within this interval (assuming no keystroke), the computer originates a call. If RING becomes "true" during the 10-second interval, the computer answers the call.

A further understanding of the nature and advantages of the present invention may be realized by reference to the remaining portions of the specification and to the attached drawings.

BRIEF DESCRIPTION OF THE DRAWINGS

FIG. 1 is a block diagram of a computer system utilizing the present invention;

FIG. 2A is a block diagram of a first embodiment of the present invention for use with an external modem;

FIG. 2B is a block diagram illustrating the connectors for the first embodiment;

FIG. 2C is a schematic diagram illustrating the detailed pin connections for the first embodiment;

FIGS. 3A-B are circuit schematics of the first embodiment;

FIG. 4 is a flow chart illustrating the sequence on power-up, utilizing the first embodiment;

FIG. 5 is a block diagram of a second embodiment;

FIG. 6 is a circuit schematic of the second embodiment; and

FIG. 7 is a flow chart illustrating the sequence on power-up utilizing the second embodiment.

DESCRIPTION OF THE PREFERRED EMBODIMENTS

Overview

FIG. 1 is a block diagram illustrating the present invention. Generally, the invention operates to control the application of power (normally AC line power) from a source 10 to a computer 12 so that power may be selectively applied on the basis of signals on, or representative of those on, a communication medium such as a phone line 15. In accordance with known practice, computer 12 is interfaced to phone line 15 by an associated modem 17 which may be a stand-alone (external) device or a built-in (internal) device.

The invention contemplates interposing a power switching element 20 between power source 10 and computer 12, and controlling the power switching element by a control signal generated by power control logic 22 (sometimes referred to as "logic 22"). Depending on the embodiment, power control logic 22 is responsive to signals on phone line 15 or signals that are communicated between modem 17 and computer 12. Thus, computer 12 may be kept in an unpowered state, and then automatically powered up in response to an incoming data call. Additionally, power control logic may be responsive to signals from an alarm clock 23 so that the computer may be automatically powered up at a predetermined time to place an outgoing call. A surge protector 25 is preferably coupled to the lines from power source 10 to protect logic 22 and computer 12 against damage from high voltage transients that may appear on the power lines.

The invention contemplates that computer 12 is programmed to take appropriate action when powered up automatically. This is possible if the computer has a software facility for executing a batch job at power up. On the IBM personal computer, such a facility is called AUTOEXEC.BAT. The invention contemplates that certain routines, to be described below, will be provided, and their names placed in the file of jobs to be executed at power up.

The invention will be described below with reference to two embodiments. In the first embodiment, call status is inferred from signals passing between modem 17 and computer 12. In the second embodiment, call status is inferred from voltages on phone line 15. As a general matter, power switching element 20, logic 22, alarm clock 23, and surge protector 25 can be built into the modem or the computer. However, the description will be in terms of self-contained apparatus for use with pre-existing computers and modems. In this framework, the first embodiment is preferred where the modem is separate from the computer while the second is intended for use where the modem is built into the computer.

First Embodiment—External Modem

FIG. 2A is a block diagram illustrating a first embodiment of the invention for use with an external modem, designated 17E. This embodiment may be implemented by providing a separate enclosure 30 that incorporates power switching element 20, power control logic (designated 22E), alarm clock 23, and surge protector 25. Alternatively, these elements could be incorporated into the modem enclosure to provide an external modem that had the further capabilities afforded by the invention. The description below is in terms of the separate enclosure.

Modem 17E is coupled to phone line 15 and includes an interface 32 for communications with computer 12. Computer 12 includes a communications port 33 which normally would be coupled via a multiconductor cable to interface 32 on modem 25. However, power control logic 22E is interposed between interface 32 and communications port 33.

FIG. 2B is a block diagram illustrating the connectors for the circuitry within enclosure 30. To the end of effecting the actual circuit connections, enclosure 30 is provided with an AC outlet 35 into which the computer's line cord is plugged, an AC line cord 36 for connection to power source 10, a connector 37 like that in port 33 for connection via cable to interface 32 on the modem, and a connector 38 like that in interface 32 for connection via cable to port 33 on the computer.

While all the data and control lines from interface 32 and port 33 are communicated to the connectors on enclosure 30, only a small number of the signals are sensed or modified by power control logic 22E.

FIG. 2C is a schematic diagram illustrating the details of the pin connections of connector 37 (designated P2) and connector 38 (designated J3).

The following signals are passed through unit 30 unused and unchanged:
 TXD—transmit data (pin 2, from computer);
 RXD—receive data (pin 3, from modem);
 RTS—request to send (pin 4, from computer);
 CTS—clear to send (pin 5, from modem); and
 DSR—data set ready (pin 6, from modem).

Protective ground (pin 1) which is used to provide a common ground reference between modem 17E and computer 12 is also tied to the A/C ground line within enclosure 30. Signal ground (pin 7) provides a common ground to which all other signals on the cable are referenced, and is tied to the common (signal) ground line within enclosure 30.

Power control logic 22E operates to sense and/or modify the following signals:
 RLSD—received line signal detect (pin 8, from modem);
 DTR—data terminal ready (pin 20, from computer); and
 RI—ring indicate (pin 22, from modem).

RLSD is asserted by modem 17E upon the detection of a valid data signal (carrier present) on phone line 15. While logic 22E senses this signal, it passes RLSD to computer 12 unchanged.

DTR is asserted by the computer 12 to signify that the computer intends to use port 33 for some purpose. Most modems take the assertion of this signal to signify that communication over the phone line is allowable, and the assertion of this signal is normally required to keep the modem in an active state. Logic 22E monitors this signal to determine when computer 12 is using port 33, but forces the signal to a "true" value when the computer is powered down so that modem 17E remains operable to answer incoming phone calls.

RI is asserted by modem 17E, but is ignored, and a substitute signal is provided by logic 22E. Normally, RI would indicate an incoming call, but the substituted RI signal signifies that the computer has been powered up automatically, either by an incoming call or an alarm signal from alarm clock 23.

FIGS. 3A–B are circuit schematics of the circuitry within enclosure 30. Reference numerals corresponding to those in FIGS. 2A–B are used where appropriate. FIG. 3A shows power control logic 22E and alarm clock 23. Power switching element 20 is provided by a power relay K1 which is driven by a transistor Q1. The RLSD signal from modem 17E is designated RLSDIN while the signal communicated to computer 12 is designated RLSDOUT. The DTR signal from computer 12 is designated DTRIN, while the signal communicated to modem 25 is designated DTROUT. It will be assumed that a "true" value for RLSD or DTR corresponds to a high level on the RLSDIN or DTRIN line, as the case may be. RLSDIN, RLSDOUT, DTRIN, and DTROUT are EIA-RS232 signals ($\pm 12$ volts nominal).

DTRIN and RLSDIN are inverted at respective inverters U1.1 and U1.2 to provide complementary TTL signals $\overline{\text{DTRIN}}$ and $\overline{\text{RLSDIN}}$. Except for successive inversions at inverter U1.2 and a NAND gate U3.2, RLSDOUT is substantially identical to RLSDIN. DTRIN is gated at a NAND gate U3.1, as will be described below. Inverters U1.1 and U1.2 convert the RS-232 signals to standard logic levels. NAND gates U3.1 and U3.2 convert the logic levels back to RS-232 levels.

$\overline{\text{DTRIN}}$ is inverted at a NOR gate U2.1 to provide a signal DTR which is high when DTRIN is high. $\overline{\text{DTRIN}}$ and $\overline{\text{RLSDIN}}$ are also communicated through diodes CR1 and CR2 to a common input node 40 of a power hold-up circuit 42 to provide a signal $\overline{\text{DTR*RLSD}}$ which is high (subject to a delay) when DTRIN and RLSDIN are both low. DTR and $\overline{\text{DTR*RLSD}}$ are applied to the set and reset inputs of a flip-flop 45 defined by cross-coupled NOR gates U2.2 and U2.3.

Alarm clock 23 is a standard digital clock module having an output, designated $\overline{\text{ALARM}}$, which goes low when the content of the running time register equals the content of the preset alarm register. This low level persists for a predetermined time interval such as 59 minutes. Depending on the certain options desired, various of the input terminals of the clock module may be grounded. Thus, terminal W2 is grounded if a non-flashing colon is desired, terminal W3 is grounded if AC power source 10 (FIG. 1) is 50 Hz rather than 60 Hz, and terminal W4 is grounded if 24-hour operation is desired. A single-pole, double-throw, center-off ("SPDT-CO") switch S1 is used for setting the time (up-fast, down-slow). A similar switch S2 is used to determine whether it is the clock time or the alarm time that is being set (up-clock, down-alarm).

$\overline{ALARM}$ and $\overline{DTR*RLSD}$ are inverted at respective inverters U1.3 and U1.4, and what amounts to the logical OR of the inverted signals is applied to the base of transistor Q1. Thus, transistor Q1 is turned on (to energize relay K1) if either $\overline{ALARM}$ or $\overline{DTR*RLSD}$ is low. $\overline{ALARM}$ and $\overline{DTR*RLSD}$ are combined at a NAND gate to provide the substituted RING signal RIOUT which is asserted (high) whenever $\overline{ALARM}$ or $\overline{DTR*RLSD}$ is low.

A SPDT-CO switch S3 allows either one of the U1.3 and U1.4 outputs to be grounded, thereby rendering either $\overline{ALARM}$ or $\overline{DTR*RLSD}$ ineffective to turn transistor Q1 on. A SPDT-CO switch S4 is provided to completely override the automatic powering up and down of the invention. In the "up" position, the collector of transistor Q1 is grounded and relay K1 energized, regardless of other signals in the system. In the "down" position, both the U1.3 and U1.4 outputs are pulled low through respective diodes CR3 and CR4, thereby keeping transistor Q1 off and relay K1 un-energized.

Hold-up circuit 42 comprises a comparator U4 having a negative input terminal which is held at a fixed level ((220/320) V+ or 3.44 volts for V+ = 5 volts) as defined by a voltage divider and a positive input terminal which is coupled to ground through a capacitor C1, to V+ volts through a high (330K) resistor R1, and to input node through a low (1K) resistor R2. The voltage (charge) on capacitor C1 relative to the fixed voltage thus determines the state of $\overline{DTR*RLSD}$.

The operation of the circuitry of FIG. 3A will be described with reference to the normal sequence that occurs for an incoming data call. It will be assumed that the alarm does not enter into the sequence. Initially, DTR and RLSD are "false," i.e., DTRIN and RLSDIN lines are low, and $\overline{DTRIN}$ and $\overline{RLSDIN}$ are high. Thus, diodes CR1 and CR2 are off, and capacitor C1 is charged to almost 5 volts, whereupon the output of comparator U4 ($\overline{DTR*RLSD}$) is high. This high level is inverted at inverter U1.4, so that the base of transistor Q1 is low. This keeps the transistor off and relay K1 unenergized. Thus, power is preventing from flowing to computer 12.

With DTRIN and RLSDIN low, the output of flip flop 45 is low (reset state), whereupon gate U3.1 keeps DTROUT high so that modem 17E remains in an active state operable to answer an incoming call should one occur.

Upon the occurrence of an incoming call, the modem asserts RLSDIN so that RLSDIN goes high. This causes a low level at the output of inverter U1.2, thereby quickly discharging capacitor C1 through resistor R2 and diode CR1. The output of comparator U4 then goes low which turns transistor Q1 on, thereby energizing relay K1 and causing power to be applied to computer 12. Flip-flop 45 remains in its reset state so that DTROUT is still maintained in a forced "true" state. When the comparator output goes high, the RIOUT line from NAND gate U3.3 to the computer goes high.

Although the operation of computer 12 upon being powered up in this manner will be described below, it suffices to note at this point that the computer will assert DTR (make DTRIN high). This causes the output of NOR gate U2.1 (DTR) to go high which sets flip-flop 45. DTROUT remains high, however, since DTRIN is now high. Thus, the call is answered and continues in progress until computer 12 terminates the call.

Computer 12 terminates the call by making DTRIN low. When DTRIN goes low, flip-flop 45 is set, and the low or "false" state of DTRIN is passed to DTROUT, and thus to modem 17E. The modem in turn makes RLSDIN low, indicating that the call has been terminated. With DTRIN and RLSDIN having both gone low, the inverted values are high and keep diodes CR1 and CR2 off. Capacitor C1 then charges through resistor R1 toward 5 volts at a rate characterized by the RC time constant of 33 seconds for the component values indicated. Thus, the capacitor voltage reaches 3.44 volts in approximately 30 seconds, which causes the comparator output to go high, relay K1 to be de-energized, and computer 12 to be powered down. In the event that the computer needs to initiate another call without losing power, it must initiate this call, that is assert DTRIN, within this 30-second interval. When DTRIN is asserted, capacitor C1 is discharged through diode CR2, thereby preventing K1 from being de-energized.

The circuit operation in response to an alarm signal is similar in that a low level on the $\overline{ALARM}$ line from alarm clock 23 also causes relay K1 to be energized and RIOUT to be asserted.

FIG. 3B is a circuit schematic illustrating the power supplies for the elements illustrated in FIG. 3A. The power supply configuration is standard and will not be described except to note that surge protector 25 is defined by three metal oxide varistors VR1, VR2, and VR3 connected across the transformer primary winding.

For purposes of the above description of the circuitry for controlling the application of power to computer 12, it was assumed that the computer would take appropriate action for answering an incoming call or placing an outgoing call when automatically powered up. FIG. 4 is a flow chart of the program that is executed at power up as part of the computer's automatic power-up batch job for the above-described first embodiment.

The initial test is to determine whether the computer was powered up automatically or manually. As discussed above, the substituted RING INDICATE signal RIOUT is asserted when an incoming call occurs or alarm clock 23 asserts $\overline{ALARM}$. Thus, the computer first tests RIOUT (branch 50), and if RIOUT is not asserted, by-passes the communications handling portion of the software. If RIOUT was asserted, the computer tests RLSDOUT (branch 52). RLSDOUT "true" signifies that the computer was powered up as the result of an incoming call; RLSDOUT "false" signifies that the computer was powered up as the result of an alarm signal. In either case, the computer sets the pointer to the appropriate batch job name, either for answering an incoming call (block 53) or originating an outgoing call (block 55). Then, the computer initiates the appropriate batch job by an operating system call (block 57).

It should be noted that the details of the procedures to be followed may be set up in an appropriate configuration file containing lists of specifications which determine data transmission/reception speeds, phone numbers to dial, log-in and data request sequences to transmit, and appropriate storage locations for incoming data. Indeed, the user may specify that the communications handler do nothing at all, and some additional program used to handle the power-on situation as desired. In any event, once the specified power-up response has been carried out, the program terminates (block 58) and allows the rest of the power-up batch job to complete normally.

Second Embodiment—Internal Modem

FIG. 5 is a block diagram illustrating a second embodiment of the invention for use where computer 12 has an internal modem, designated 17I. While this embodiment could also be used with an external modem, the first embodiment would normally be preferred in such a case.

This embodiment may be implemented by providing an enclosure 70 that incorporates power switching element 20, power control logic (designated 22I), and alarm clock 23. In this embodiment, modem 17I is coupled to phone line 15, and the phone line is monitored directly by phone line monitoring circuitry 75 associated with power control logic 22I. As in the case of the first embodiment, power switching element 20 is interposed between AC power source 10 and the power input of computer 12. However, while the actual conductors of phone line 15 are communicated to the connectors on enclosure 70, the voltages are monitored but left substantially unmodified prior to their being communicated to modem 17I.

The status of a possible call on phone line 15 may be inferred from the voltage appearing between the phone line conductors known as the tip and the ring. When the phone is on-hook, a tip-ring voltage of approximately 40-105 volts DC will appear. When the phone is off-hook, it draws sufficient current to cause this voltage to drop to a level below about 15 volts. However, the voltage will remain greater than about 2.5 volts so long as the phone line is actually connected to the phone system. An incoming call is detected by monitoring the phone line for a characteristic signal consisting of a series of pulses of approximately 100 volts in amplitude, repeated approximately 20 times per second. These pulses appear for approximately 2 seconds, disappear for approximately 4 seconds, and the sequence repeats until the phone is answered or until the call is discontinued by the originator.

In its broadest aspect, phone line monitoring circuitry 75 senses the tip-ring voltage and generates signals, designated PRESENT, RING, and OFF-HOOK, signifying that the device is connected to the phone system, that a call is incoming, and that a call is in progress, respectively. Optical isolators are used to electrically isolate most of the circuitry from the phone line. A surge protector 77 (in addition to surge protector 25) is preferably coupled to phone lines 15 to protect line monitoring circuitry 75 and modem 17I against damage from high voltage transients that may appear on the phone line.

FIG. 6 is a circuit schematic of power control logic 22I and phone line monitoring circuitry 75. Of the remaining circuitry located within enclosure 70, alarm clock 23 and the power supply are generally as for the first embodiment and will not be described or illustrated. Primed reference numerals corresponding to those in FIG. 3A are used where appropriate.

Broadly, phone line monitoring circuit 75 includes a RING circuit 80, an OFF-HOOK circuit 82, and a PRESENT circuit 85. Surge protector 77 is defined by three varistors VR5, VR6, and VR7 which limit the voltage appearing across any portions of these circuits to less than about 95 volts, and thus provide lightning and surge protection for the modem.

RING circuit 80 monitors the tip-ring voltage directly, while OFF-HOOK circuit 82 and PRESENT circuit 85 monitor a rectified voltage as provided by a diode bridge 90. RING circuit 80 and OFF-HOOK circuit 82 control the voltage at a circuit point 92 while PRESENT circuit 85 controls the voltage at a circuit point 95. Circuits 80, 82, and 85 are, in effect, threshold circuits, as will be discussed below.

RING circuit 80 includes an optical isolator U5, the photodiode of which is coupled in series with a blocking capacitor C3 and a limiting resistor R3. A diode CR5 across the photodiode limits the reverse bias across the photodiode and provides a symmetric load to the circuit. The collector of the isolator's phototransistor is coupled to the positive supply, designated V+. The emitter of the phototransistor is coupled to circuit point 92.

When an incoming call occurs, the AC voltage component is sufficient to drive enough current for the photodiode to turn the phototransistor on. Circuit point 92 is pulled to about V+. In the absence of an incoming call, the phototransistor is off, and RING circuit 80 has no effect on circuit point 92.

OFF-HOOK circuit 82 includes an optical isolator U6, the photodiode of which is coupled in series with a current-limiting circuit consisting of a transistor Q2, a zener diode CR6, and two resistors. The phototransistor collector is coupled to the base of a transistor Q3 whose collector is held at V+ and whose emitter is coupled to circuit point 92.

When the call is answered, the tip-ring voltage drops to below about 15 volts. In such a case, there is insufficient current through the photodiode to turn the phototransistor on. With the phototransistor off, transistor Q3 is on, and circuit point 92 is pulled to about V+. When the phone is on-hook, the tip-ring voltage exceeds about 15 volts, and sufficient current flows through transistor Q2 to cause the photodiode in isolator U6 to conduct. This turns the phototransistor on, thereby keeping transistor Q3 off, and OFF-HOOK circuit 82 has no effect on circuit point 92.

PRESENT circuit 85 is similar to OFF-HOOK circuit 82 except that the circuit is configured to operate at a threshold of about 2.5 volts rather than 15 volts. Thus, the photodiode of an isolator U7 is coupled in series with a current limiting network which includes a transistor Q4, diodes CR7 and CR8 (corresponding to zener diode CR6), and two resistors. The collector of the phototransistor in isolator U7 is connected to the base of a transistor Q5 whose emitter is grounded and whose collector is connected to circuit point 95.

So long as the tip-ring voltage exceeds about 2.5 volts, the photodiode in isolator U7 conducts and turns the phototransistor on, whereupon transistor Q5 is off and presents a high impedance at circuit point 95. If the tip-ring voltage is below about 2.5 volts, the isolator turns off, and transistor Q5 conducts, pulling circuit point 95 low.

Circuit points 92 and 95 are coupled to a power hold-up circuit 97 which consists of a capacitor C3, a charging resistor R4, and a discharging resistor R5. Capacitor C3 is connected between circuit point 95 and ground, resistor R4 between circuits points 92 and 95, and resistor R5 between circuit point 92 and ground.

Circuit point 95 is coupled to the positive input of a comparator U8.1 and the negative input of a comparator U8.2. The negative input of comparator U8.1 is held at $(\frac{2}{3})$V+ while the positive input of comparator U8.2 is held at $(\frac{1}{3})$V+. The outputs of comparators U8.1 and U8.2 are applied to the reset and set inputs of a flip-flop 100 defined by cross-coupled NOR gates U9.1 and U9.2. The flip-flop output is applied to the base of relay driver transistor Q1' which controls power relay K1'.

The operation of the circuitry of FIG. 6 will now be described with reference to the normal sequence that occurs for an incoming data call. Prior to the incoming call, no ringing signal is present, and isolator U5 is off. Similarly, the tip-ring voltage is above 15 volts, which is sufficient to keep isolator U6 on and transistor Q3 off. Thus, neither isolator U5 nor transistor Q3 controls circuit point 92. Moreover, if the phone line is connected to the system, sufficient voltage is present to keep transistor Q4 and isolator U7 conducting, whereupon transistor Q5 is off and does not affect the voltage at circuit point 95.

To the extent this condition has persisted for several minutes, capacitor C3 has been able to discharge through resistors R4 and R5, whereupon the voltage at circuit point 95 is zero. Comparator U8.1 has a low output and comparator U8.2 has a high output, whereupon flip-flop 100 is in the reset state. This keeps transistor Q1' off, so that relay K1' is not energized and power is withheld from the computer.

When an incoming call occurs, the phototransistor in isolator U5 pulls circuit point 92 high as discussed above, and when the call is answered, transistor Q3 holds circuit point 92 high. Accordingly, capacitor C3 begins to charge toward V+ through resistor R4, and when this voltage reaches $(\frac{1}{3})V+$, the output of comparator U8.2 goes low. This no longer forces flip-flop 100 to a reset state, but does not affect the state. When the voltage on capacitor C3 exceeds $(\frac{2}{3})V+$, the output of comparator 8.1 goes high, thereby setting the flip-flop. This turns transistor Q1' on, which energizes relay K1' and causes power to be applied to the computer. The values of R4 and C3 are chosen to define an RC time constant such that capacitor C3 charges to $(\frac{2}{3})V+$ in about 1 second. During the call, circuit point 92 remains high, so that after a few seconds, capacitor C3 is charged to about V+.

When the call is terminated, circuit point 92 is no longer held high; in effect, it becomes disconnected from the line monitoring circuitry. Capacitor C3 then discharges through resistors R4 and R5. Once the capacitor has discharged to $(\frac{2}{3})V+$, the output of comparator U8.1 goes low and no longer holds flip-flop 100 set; and when the voltage drops below $(\frac{1}{3})V+$, the output of comparator U8.2 goes high, causing flip-flop 100 to be reset. This causes power to be withdrawn from computer 12 as described above. The value of R5 is chosen so that capacitor C3 discharges to less than $(\frac{1}{3})V+$ in about 30 seconds. Thus, power is withdrawn only after there have been no rings detected and no off-hook condition for at least 30 seconds.

FIG. 7 is a flow chart of the program for the second embodiment. While the program operation is generally similar to the operation for the first embodiment, there is no signal analogous to the RIOUT signal of the first embodiment. To circumvent this problem, the computer prompts the user to strike a key on the computer keyboard to indicate, in effect, that the power-up was manual rather than automatic. Initially, the computer tests whether a key is depressed (branch point 130), and if so, bypasses the communications handling portion of the program. If no key was depressed, the computer tests whether the RING INDICATE signal from the internal modem is true (branch 132), and if so, assumes that the computer was automatically powered-up, sets the pointer for the batch job for answering an incoming call (block 135). If the RING INDICATE signal is not asserted, the computer tests whether 10 seconds have elapsed since power up (branch 137). If not, the computer branches back to test again for a keystroke. Once 10 seconds have elapsed with no key struck and no ring signal detected, it is assumed that the power-up occurred as a result of a timer wakeup, and the pointer is set to the batch job for originating a call (block 138). Thereafter, the batch job is initiated via an operating system call (block 140).

CONCLUSION

In summary, it can be seen that the present invention provides apparatus and a method that allow a computer to be left in an unattended, unpowered state, and yet operate to receive incoming data calls and originate outgoing calls at a desired time. The invention may be implemented with computers having external (stand-alone) or internal (built-in) modems.

While the above is a complete description of the preferred embodiments of the invention, it will be understood that modifications, alternate constructions, and equivalents may be employed without departing from the spirit of the present invention. For example, while the first embodiment was configured for operation with a "standard" modem providing specific protocol signals, other communications protocols could be handled as well. Additionally, the invention could be incorporated directly into the computer, although in such a case a continuous power supply (such as a battery) would be needed for the logic circuitry. While either embodiment could be built into the computer, the first embodiment would normally be preferred. In such a case, the modem would also have to be kept powered. Therefore, the above description should not be taken as limiting the scope of the invention which is defined by the appended claims.

TABLE 1

| Component Types | | |
|---|---|---|
| U1 | 1489 | EIA-TTL converter |
| U2 | 4001 | CMOS quad NOR gate |
| U3 | 1488 | TTL-EIA converter |
| U4 | LM393 | Dual comparator |
| Q1 | 2N2222A | NPN transistor |
| CR1 | IN4148 | Switching diode |
| CR2 | IN4148 | Switching diode |
| CR3 | IN4148 | Switching diode |
| CR4 | IN4148 | Switching diode |
| U5 | TIL 117 | Opto-isolator |
| U6 | TIL 117 | Opto-isolator |
| U7 | TIL 117 | Opto-isolator |
| U8 | LM393 | Dual comparator |
| U9 | 7402 | TTL quad NOR gate |
| Q1 | 2N2222A | NPN transistor |
| Q2 | TIP 47 | NPN transistor |
| Q3 | 2N2222A | NPN transistor |
| Q4 | TIP 47 | NPN transistor |
| CR5 | IN4148 | Switching diode |
| CR6 | IN5245 | 15 V, $\frac{1}{2}$ W Zener diode |
| CR7 | IN4148 | Switching diode |
| CR8 | IN4148 | Switching diode |

What is claimed is:

1. Apparatus for use with a modem and a computer for controlling the application of power to the computer, the computer having a power input adapted to receive power from an electrical power source, the apparatus comprising:

power switching means, adapted to be interposed between the power source and the power input, for controlling the flow of power from the power source to the power input, said power switching means being responsive to a control signal, the assertion of which permits power to flow and the withdrawal of which prevents power from flowing; and logic means, coupled to said power switching means and adapted to be interposed between the computer and the modem, for controlling said power switching means, said logic means being responsive to a data terminal ready signal (DTR) from the computer and a received line signal detect signal (RLSD) from the modem, said logic means operating as follows:
  (a) if RLSD is "true," to assert said control signal,
  (b) if DTR is "true," to assert said control signal and communicate said "true" value of DTR to the modem, and to communicate thereafter the actual value of DTR to the modem when DTR changes value from "true" to "false," at least until the modem transmits a "false" RLSD to the logic means and
  (c) if RLSD and DTR are both "false," to withdraw said control signal and to communicate a "true" value for DTR to the modem to keep the modem in an active state.

2. The invention of claim 1, said logic means comprising:
power hold-up means responsive to DTR and RLSD, for maintaining the assertion of said control signal for a predetermined time interval after DTR and RLSD both become false.

3. The invention of claim 2 wherein the logic means continue to communicate the actual value of DTR to the modem during said predetermined time interval.

4. The invention of claim 1, and further comprising:
alarm clock means, coupled to said power switching means, for asserting said control signal at a desired time.

5. The invention of claim 4, and further comprising:
override means, coupled to said power switching means, for selectively preventing said logic means or said alarm clock means from causing the assertion of said control signal.

6. The invention of claim 4, and further comprising:
means, coupled to said logic means and said alarm means, for providing a signal (RIOUT) to the computer signifying that said logic means or said alarm means has caused the assertion of said control signal.

7. The invention of claim 6 wherein the computer is programmed to execute a power-up routine which checks the state of said RIOUT signal, and, (a) for RIOUT "true" and RLSD "true," initiates a batch job for answering an incoming call, and (b) for RIOUT "true" and RLSD "false," initiates a batch job for originating an outgoing call.

8. The invention of claim 1, and further comprising:
three-state switch means, coupled to said power switching means, for overriding said logic means, said three-state switch means operating as follows
  (a) in a first state, to unconditionally cause said power switching means to permit power to flow,
  (b) in a second state, to allow said logic means to to control said power switching means, and
  (c) in a third state, to unconditionally cause said power switching means to prevent power from flowing.

9. The invention of claim 1, wherein said logic means includes:
  a flip-flop having set and reset inputs, and receiving the logical NOR of RLSD and DTR at its reset input and the logical value of DTR at its set input; and
  gating means responsive to the DTR signal from the computer and the output of said flip-flop for communicating a "true" value of DTR to the modem when said flip-flop is in its reset state and for communicating the actual value of DTR to the modem when said flip-flop is in its set state.

10. Apparatus for use with a modem and a computer for controlling the application of power to the computer, the computer having a power input adapted to receive power from an electrical power source, the apparatus comprising:
power switching means, adapted to be interposed between the power source and the power input, for controlling the flow of power from the power source to the power input, said power switching means being responsive to a control signal, the assertion of which permits power to flow and the withdrawal of which prevents power from flowing;
alarm clock means, coupled to said power switching means, for asserting said control signal at a desired time;
logic means, coupled to said power switching means and adapted to be interposed between the computer and the modem, for controlling said power switching means, said logic means being responsive to a data terminal ready signal (DTR) from the computer and a received line signal detect signal (RLSD) from the modem, said logic means operating as follows:
  (a) if RLSD is "true," to assert said cotnrol signal,
  (b) if DTR is "true," to assert said control signal and communicate said "true" value of DTR to the modem, and
  (c) if RLSD and DTR are both "false," to withdraw said control signal and to communicate a "true" value for DTR to the modem; and
means, coupled to said logic means and said alarm clock means, for providing a signal (RIOUT) to the computer signifying that aid logic means or said alarm clock means has caused the assertion of said control signal.

11. The invention of claim 10 wherein the computer is programmed to execute a power-up routine which checks the state of said RIOUT signal, and, (a) for RIOUT "true" and RLSD "true," initiates a batch job for answering an incoming call, and (b) for RIOUT "true" and RLSD "false," initiates a batch job for originating an outgoing call.

12. Apparatus for use with a computer and a modem external to the computer for controlling the application of power to the computer, the computer having a power input adapted to receive power from an electrical power source and providing a computer-reasdy signal having a "true" state indicating the computer is ready for communication, and the modem being adapted to be coupled to a communication medium such as a phone line and being further adapted to receive said computer-ready signal, whereby said modem is in an active state for interfacing with a remote communications device when said computer-ready signal is "true," said modem including means for interfacing with a remote communication device over said communication medium, the apparatus comprising:

power switching means, adapted to be interposed between the power source and said power input, for controlling the flow of power from the power source to the power input, said power switching means being responsive to a control signal, the assertion of which permits power to flow and the withdrawal of which prevents power from flowing; and logic means, coupled to said power switching means, for controlling said power switching means, said logic means being responsive to said computer-ready signal and to a modem-ready signal from said modem having a "true" state indicating an interface with another communication device has been established, said logic means operating as follows:

(a) if said modem-ready signal is "true," to assert said control signal, (b) if said computer-ready signal is "true," to assert said control signal and to communicate said "true" value of said computer-ready signal to the modem, said logic means thereafter communicating the actual value of said computer-ready signal to the modem at least until the modem transmits a "false" modem-ready signal to the logic means, and (c) if both said modem-ready signal and computer-ready signal are "false," to withdraw said control signal and to communicate a fake "true" value for said computer-ready signal to the modem to keep the modem in an active state.

13. The apparatus of claim 12 wherein said logic means further comprises power hold-up means, responsive to said computer-ready and modem-ready signals, for maintaining the assertion of said central signal for a predetermined time interval after said computer-ready and modem-ready signals both become "false," whereby the computer will receive power for sufficient time after the termination of a communication to achieve a resting state.

14. The apparatus of claim 12 wherein said computer-ready signal comprises a Data Terminal Ready (DTR) signal and said modem-ready signal comprises a Received Line Signal Detect (RLSD) signal.

15. Apparatus for use with a computer and an associated modem for controlling the application of power to the computer, the computer having a power input adapted to receive power from an electrical power source, the modem being adapted to be coupled to a communication medium such as a phone line, said modem having a power input and receiving power independently of the computer, and operating to remain in a powered state regardless of whether the computer is powered or unpowered, the apparatus comprising:

power switching means, adapted to be interposed between the power source and the power input of the computer, for controlling the flow of power from the power source to the power input of the computer, said power switching means being responsive to a control signal, the assertion of which permits power to flow and the withdrawal of which prevents power from flowing;

logic means, coupled to said power switching means, for controlling said power switching means, said logic means being responsive to signals communicated between the modem and the computer, including signals representative of an incoming call to the associated modem, said logic means operating as follows:

(a) in response to an incoming call, to assert said control signal, (b) in response to a call in progress, to assert said control signal, and (c) in response to signals indicating neither an incoming call nor a call in progress, to withdraw said control signal;

said logic means further comprising power hold-up means responsive to signals indicating a call in progress, for maintaining the assertion of said control signal for a predetermined time interval after the call is terminated;

alarm clock means, coupled to said power switching means, for asserting said control signal at a desired time; and means, coupled to said logic means and said alarm clock means, for providing a signal to the computer signifying that said logic means or said alarm clock means has caused the assertion of said control signal.

* * * * *